United States Patent
Kamata

(10) Patent No.: US 9,001,358 B2
(45) Date of Patent: Apr. 7, 2015

(54) IMAGE FORMING SYSTEM

(75) Inventor: Yoshihisa Kamata, Hadano (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 444 days.

(21) Appl. No.: 13/280,588

(22) Filed: Oct. 25, 2011

(65) Prior Publication Data

US 2012/0099152 A1 Apr. 26, 2012

(30) Foreign Application Priority Data

Oct. 26, 2010 (JP) .................................. 2010-239161

(51) Int. Cl.
| | |
|---|---|
| G06F 3/12 | (2006.01) |
| G06K 15/12 | (2006.01) |
| G06K 15/16 | (2006.01) |
| G06K 15/02 | (2006.01) |
| H04N 1/00 | (2006.01) |
| H04N 1/203 | (2006.01) |

(52) U.S. Cl.
CPC ............... G06K 15/12 (2013.01); G06K 15/16 (2013.01); G06K 15/1894 (2013.01); H04N 1/00278 (2013.01); H04N 1/00347 (2013.01); H04N 1/0062 (2013.01); H04N 1/00631 (2013.01); H04N 1/00689 (2013.01); H04N 1/00702 (2013.01); H04N 1/00782 (2013.01); H04N 1/2032 (2013.01); *H04N 2201/0082* (2013.01)

(58) Field of Classification Search
CPC . G06K 15/00; G06K 15/002; G06K 15/0082; G06K 15/22; G06F 3/1293; G06F 3/1296; G06F 3/1297; H04N 2201/008
USPC ............... 399/16, 66, 124, 297, 374; 358/1.4, 358/1.13, 1.15, 1.18, 296
See application file for complete search history.

(56) References Cited

U.S. PATENT DOCUMENTS

| | | | |
|---|---|---|---|
| 6,567,621 B2 * | 5/2003 | Miyoshi et al. | ................. 399/19 |
| 2006/0039727 A1 | 2/2006 | Lofthus et al. | |

(Continued)

FOREIGN PATENT DOCUMENTS

| | | |
|---|---|---|
| JP | 2001-287421 A | 10/2001 |
| JP | 2007-008143 A | 1/2007 |
| JP | 2009-066937 A | 4/2009 |

OTHER PUBLICATIONS

Chinese Office Action dated Jan. 17, 2014 (and English translation thereof) in counterpart Chinese Application No. 201110328983.8.

(Continued)

*Primary Examiner* — Vu B Hang
(74) *Attorney, Agent, or Firm* — Holtz, Holtz, Goodman & Chick PC

(57) ABSTRACT

A tandem-type image forming system comprises: a plurality of image forming apparatuses connected in series, the image forming apparatuses which respectively perform image formation on sides of a sheet, thereby performing a job, the image forming apparatuses including: a first image forming apparatus; and a second image forming apparatus provided upper than the first image forming apparatus in a sheet conveying direction, wherein the first image forming apparatus includes: a controlling section which controls transmission of image data generated based on printing data of the job received by the first image forming apparatus to the second image forming apparatus, and the second image forming apparatus includes: a controlling section which controls feeding of a sheet on which the image formation is performed based on the image data received from the first image forming apparatus.

6 Claims, 10 Drawing Sheets

(56) References Cited

U.S. PATENT DOCUMENTS

2006/0044596 A1* 3/2006 Ota .............................. 358/1.15
2011/0216352 A1* 9/2011 Ikeda .......................... 358/1.15

OTHER PUBLICATIONS

Japanese Office Action dated Jan. 28, 2014 (and English translation thereof) in counterpart Japanese Application No. 2010-239161.

* cited by examiner

IMAGE FORMING SYSTEM

BACKGROUND OF THE INVENTION

1. Field of the Invention

The present invention relates to an image forming system.

2. Description of the Related Art

There is a tandem-type image forming system, in which image forming apparatuses are connected in series with their sheet conveying paths being connected to one another.

For example, a tandem continuous paper printer is disclosed in Japanese Patent Application Laid-Open Publication No. 2007-8143, the tandem continuous paper printer which is equipped with a first printer, a second printer, and a printer controller, wherein the printer controller outputs the data to be printed by the first printer to the first printer and outputs the data to be printed by the second printer to the second printer.

Moreover, a printer system is disclosed in Japanese Patent Application Laid-Open Publication No. 2009-66937, the printer system which is equipped with a first printer on which a printer controller is mounted, and a second printer on which a printer controller is mounted, wherein when the printer controller mounted on the first printer receives printing data from a host, the printer controller transmits the printing data to the printer controller mounted on the second printer while saving the printing data, and each of the printer controllers processes the printing data.

However, in the tandem continuous paper printer disclosed in Japanese Patent Application Laid-Open Publication No. 2007-8143, when the printer controller assigns image data to each of the image forming apparatuses, it is necessary to check whether the image forming apparatuses finish writing preparation to form image data on a sheet, and adjust timing to convey a sheet therebetween.

Moreover, the writing preparation of the image data of the image forming apparatus provided on the downstream side in a sheet conveying direction must be completed by the stage of the arrival of the sheet conveyed from the image forming apparatus provided on the upstream side. However, if the transfer of the image data between the image forming apparatuses is executed through a communication network, such as Ethernet (registered trademark), the transfer time thereof sometimes varies depending on the congestion state of the communication network, as disclosed in Japanese Patent Application Laid-Open Publication No. 2009-66937.

Consequently, in such conventional technologies, mechanisms are required, the mechanism for temporarily halting a sheet on one side of which an image is formed by the image forming apparatus on the upstream side before conveying the sheet into the image forming apparatus on the downstream side, and the mechanism for ascertaining whether the writing preparation of image data used to form images on both sides of a sheet is completed or not in the image forming apparatus on the upstream side and the image forming apparatus on the downstream side and for adjusting the conveying timing of the sheet. Accordingly, a problem arises that the productivity lowers owing to the operations of these mechanisms.

SUMMARY OF THE INVENTION

It is an object of the present invention to eliminate the timing adjustment of sheet conveyance between image forming apparatuses, and eliminate any sheet halting mechanism, thereby improving the productivity.

A first aspect of the present invention is a tandem-type image forming system comprising:

a plurality of image forming apparatuses connected in series, the image forming apparatuses which respectively perform image formation on sides of a sheet, thereby performing a job, the image forming apparatuses including:

a first image forming apparatus; and a second image forming apparatus provided upper than the first image forming apparatus in a sheet conveying direction, wherein the first image forming apparatus includes:

a controlling section which controls transmission of image data generated based on printing data of the job received by the first image forming apparatus to the second image forming apparatus, and the second image forming apparatus includes:

a controlling section which controls feeding of a sheet on which the image formation is performed based on the image data received from the first image forming apparatus.

BRIEF DESCRIPTION OF THE DRAWINGS

The present invention will more fully be understood by the following detailed description and the accompanying drawings, but these are not intended to limit the present invention, in which drawings.

DETAILED DESCRIPTION OF THE PREFERRED EMBODIMENT

In the following, an embodiment according to the image forming system of the present invention will be described with reference to the accompanying drawings.

Figure 1:
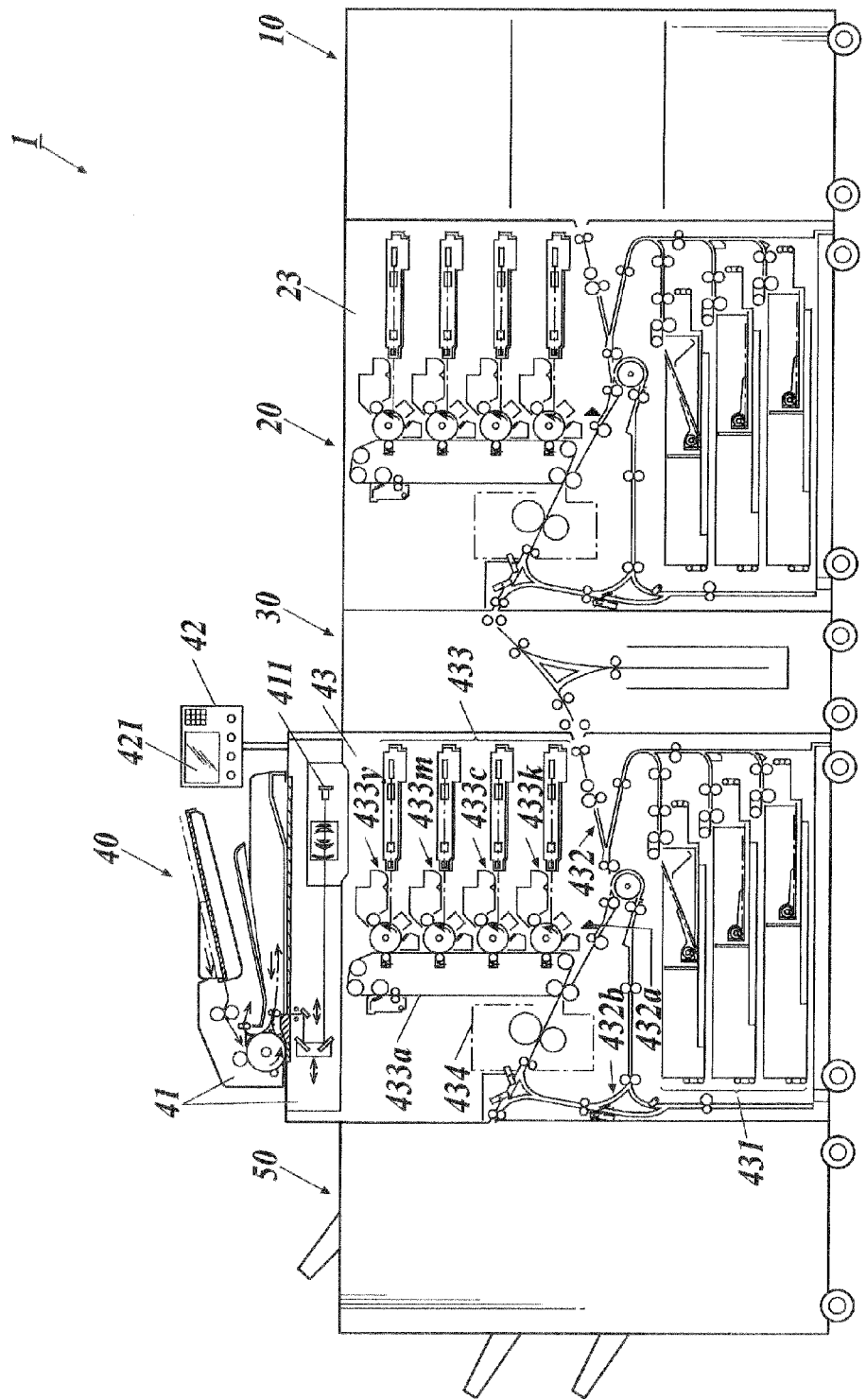
FIG. 1 is a schematic diagram of an image forming system.

FIG. 1 shows a schematic diagram of the image forming system 1 of the present embodiment.

As shown in FIG. 1, in the image forming system 1, a sheet feeding apparatus 10, a second image forming apparatus 20, a reversing apparatus 30, a first image forming apparatus 40, a finishing apparatus 50, and the like are connected in series with each other from the upstream side of the sheet conveying path.

In the image forming system 1 of the present embodiment, the second image forming apparatus 20 and the first image forming apparatus 40 each execute a job for performing image formation to different printing sides of a sheet.

Accordingly, when the image forming system 1 executes a job in a both sides printing mode for forming images on both the sides of a sheet, the second image forming apparatus 20 operates to form an image on one side (for example, on the front side) of the sheet, and the first image forming apparatus 40 operates to form another image on the other side (for example, on the back side) of the sheet.

When the image forming system 1 executes a job in a one side printing mode for forming an image on one side of a sheet, the second image forming apparatus 20 operates to form the image on the one side of the sheet. The first image forming apparatus 40 conveys the sheet without executing any image forming processing to the sheet.

The sheet feeding apparatus 10 is also called a paper feed unit (PFU). The sheet feeding apparatus 10 is equipped with a plurality of sheet feeding trays, a sheet feeding section, and the like. The sheet feeding section is composed of sheet feeding rollers, separating rollers, a sheet feeding/separating rubber, a sending roller, and the like. Each of the sheet feeding trays stores previously distinguished sheets of paper into each kind of sheet (such as paper type, basis weight, and sheet size). The sheet feeding section conveys the sheets stored in each of the sheet feeding trays sheet by sheet from the uppermost sheet to the sheet conveying section of the second image forming apparatus 20.

The second image forming apparatus 20 is provided on the upstream side in the sheet conveying direction in comparison with the position of the first image forming apparatus 40. The second image forming apparatus 20 is equipped with a printing section 23 and the like. The second image forming apparatus 20 forms an image on a sheet. The printing section 23 provided in the second image forming apparatus 20 is similar to a printing section 43, which will be described later, provided in the first image forming apparatus 40. Accordingly, the description of the printing section 23 is omitted.

The reversing apparatus 30 is provided between the first image forming apparatus 40 and the second image forming apparatus 20. The reversing apparatus 30 conveys a sheet conveyed from the second image forming apparatus 20 to the first image forming apparatus 40. The reversing apparatus 30 is equipped with a sheet reversing section, including reversing rollers and the like; a stacking section, stacking a plurality of sheets; and the like.

When it is needed to reverse the front and the back of a sheet to be conveyed to the first image forming apparatus 40, the front and the back of the sheet conveyed from the second image forming apparatus 20 is reversed by the sheet being switched back in the sheet reversing section, and the sheet is conveyed to the first image forming apparatus 40.

If the reversing of a sheet to be conveyed from the second image forming apparatus 20 to the first image forming apparatus 40 is performed in the sheet reversing section in the second image forming apparatus 20, the reversing apparatus 30 need not be provided in the image forming system 1.

The first image forming apparatus 40 is provided on the most downstream side in the sheet conveying direction among the plurality of image forming apparatus equipped by the image forming system 1. The first image forming apparatus 40 reads an image from a document and forms an image of the read image on a sheet. The first image forming apparatus 40 receives printing data of a page description language (PDL) format, such as the Tiff format, and printing setting data, in which various output instructions to the printing data are set, from an external apparatus or the like, and performs the image formation of an image on the basis of the received printing data, the received printing setting data, and the like. The first image forming apparatus 40 is equipped with an image reading section 41, an operation displaying section 42, the printing section 43, and the like.

The image reading section 41 is equipped with an automatic document feeder (ADF), and a reading section. The image reading section 41 reads the image of a document on the basis of the setting data received by the operation displaying section 42 and generates image data of an analog signal. A document placed on the document tray of the automatic document feeder is conveyed to the contact glass, situated at the reading position of the document, and the image (s) on one side or both sides of the document is (are) read by an optical system including a charge coupled device (CCD) 411. The image data, here, indicates not only the data of image such as a figure and a picture, but also the text data of a letter, a mark, and the like.

The operation displaying section 42 is composed of a liquid crystal display (LCD) 421, a touch panel, provided to cover the LCD 421, various switches and buttons, numeric keys, a group of operation keys, and the like. The operation displaying section 42 receives an instruction from a user and outputs the operation signal to a controlling section 450. Moreover, the operation display section 42 displays various setting screens for inputting various operation instructions and setting data, various processing results, and the like in conformity with display signals input from the controlling section 450.

The printing section 43 performs the image forming processing of an electrophotographic printing system. The printing section 43 is equipped with each section pertaining to print outputting, such as a sheet feeding section 431, a sheet conveying section 432, an image forming section 433 for respective colors, a fixing section 434, and the like.

An example of applying the electrophotographic printing system will be described as to the printing section 43 of the present embodiment. However, the printing system that is applied to the printing section 43 is not limited to that one, but the other printing systems, such as an ink jet system and a thermal dye sublimation system, may be applied to the printing section 43.

The sheet feeding section 431 is equipped with a plurality of sheet feeding trays and a sheet feeding device provided to each of the sheet feeding trays, which sheet feeding device is composed of sheet feeding rollers, separating rollers, a sheet feeding/separating rubber, a sending roller, and the like. Each of the sheet feeding trays stores sheets of paper that are distinguished in advance on the basis of each kind of sheets (such as a paper type, a basis weight, and a sheet size). The sheets stored in each of the sheet feeding trays is conveyed from the uppermost part thereof to the sheet conveying section 432 sheet by sheet by the sheet feeding section 431.

The sheet conveying section 432 conveys a sheet conveyed from the reversing apparatus 30 or the sheet feeding section 431 to the secondary transferring position of the image forming section 433 through a sheet conveying path to the image forming section 433 through a plurality of intermediate rollers, a resist roller, and the like. The sheet is once halted on the upstream side of the resist roller in the sheet conveying direction, and the conveyance of the sheet to the downstream side of the resist roller in the sheet conveying direction is restarted according to the writing timing of the image forming section 433.

Moreover, the sheet conveying section 432 is equipped with a resist sensor 432a, provided in the vicinity of the resist roller on the upstream side thereof in the sheet conveying direction, and a reversely conveying section 432b. The resist sensor 432a is a sensor detecting a sheet passing by the resist roller. The resist sensor 432a outputs an ON signal to the controlling section 450 when a sheet arrives at the position of the resist roller and outputs an OFF signal after the sheet passes by the resist roller. The reversely conveying section 432b reverses a sheet ejected from the fixing section 434 in a switch back way with reversing rollers and the like to reverse the front and the back of the sheet, and conveys the sheet to the finishing apparatus 50 or the secondary transferring position.

The image forming section 433 is equipped with a photosensitive drum, a charging device, an exposing device, a developing device, a primary transferring roller, a cleaning device, and the like. The image forming section 433 outputs a sheet on which an image is formed on the basis of printing image data. If the first image forming apparatus 40 forms a color image, the image forming section 433 of each color is provided.

In an image forming section 433*y* forming a yellow (Y) image, a light in accordance with printing image data of yellow (Y) is radiated from the exposing device onto the outer surface of the photosensitive drum charged by the charging device, thereby an electrostatic latent image is written thereon. A charged yellow (Y) toner then adheres to the outer surface of the photosensitive drum, on which the electrostatic latent image is written, by the developing device, thereby the electrostatic latent image is developed. The toner adhered onto the photosensitive drum by the developing device is transferred onto an intermediate transfer belt 433*a* at a primary transferring position, where the primary transferring roller is located, by the rotation of the photosensitive drum at a constant speed. After the toner is transferred onto the intermediate transfer belt 433*a*, the residual charges, the residual toner, and the like on the outer surface of the photosensitive drum are removed by the cleaning device, and the removed toner and the like are collected into a toner collecting box.

Similarly, each of image forming sections 433*m*, 433*c*, and 433*k* for forming the images of the colors of magenta (M), cyan (C), and black (K), respectively, is equipped with a charging device, an exposing device, a developing device, a primary transferring roller, a cleaning device, and the like, each located around a photosensitive drum. The image forming sections 433*m*, 433*c*, and 433*k* form toner images of magenta (M), cyan (C), and black (K), respectively.

The toner images of the respective colors that are transferred onto the intermediate transfer belt 433*a* are collectively transferred onto a sheet at a secondary transferring position, where secondary transferring rollers are located.

The fixing section 434 is composed of a fixing heater, fixing rollers, a fixing external heating section, and the like. The fixing section 434 performs the heat fixing of a toner image transferred onto a sheet.

The sheet subjected to the fixing processing by the fixing section 434 is conveyed to the finishing apparatus 50 or to the reversely conveying section 432*b* by sheet ejecting rollers and the like.

The finishing apparatus 50 is equipped with various finishing units, such as a reversing unit, a sorting unit, a stapling unit, a punching unit, a folding unit, and a pamphlet binding unit; a copy receiving tray; and the like. The finishing apparatus 50 performs various kinds of finishing to a sheet conveyed from the first image forming apparatus 40 in conformity with instructions from the first image forming apparatus 40, and ejects the sheet subjected to the finishing to the copy receiving tray.

Figure 2:
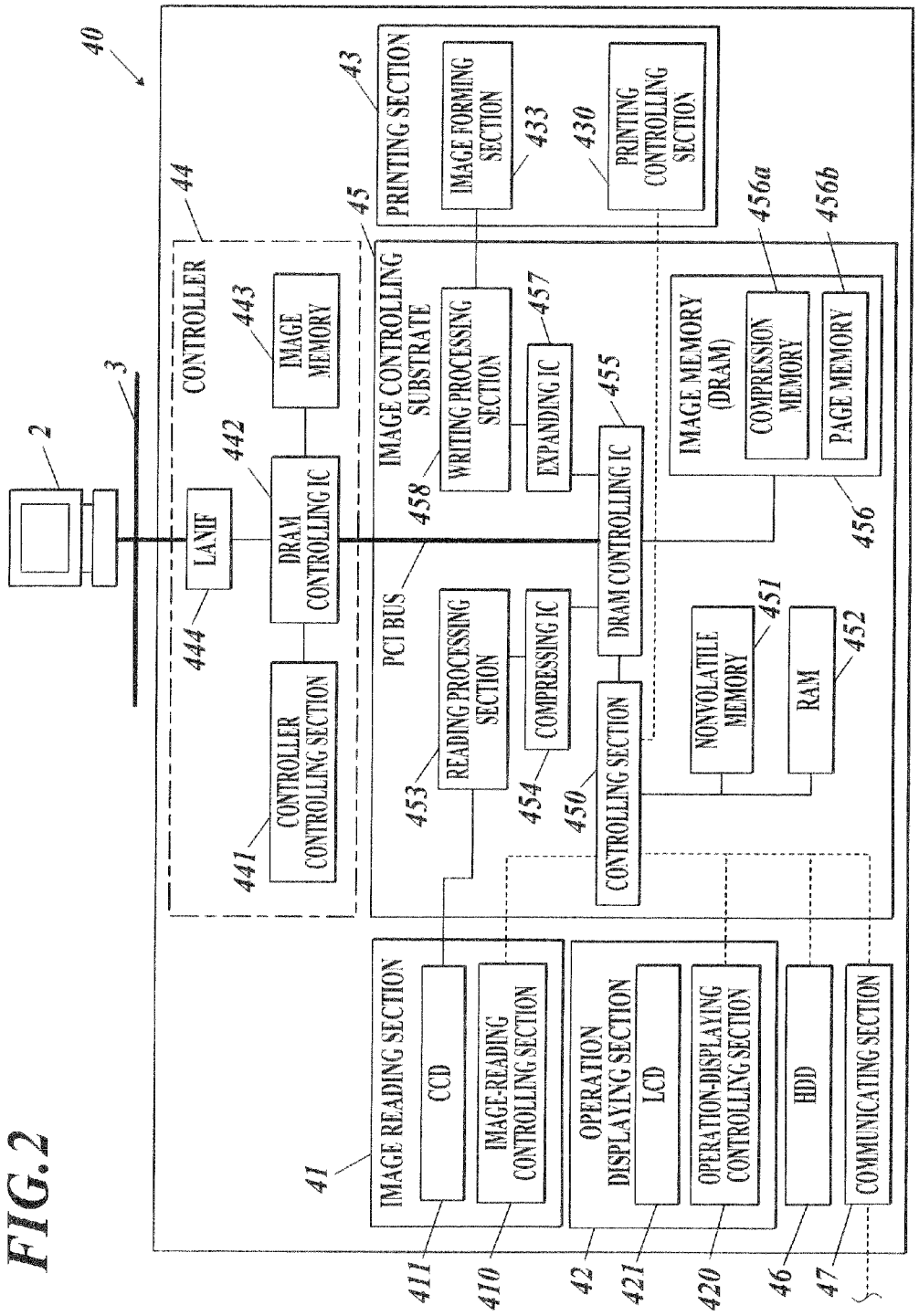
FIG. 2 is a schematic diagram of a first image forming apparatus.

FIG. 2 shows a schematic diagram of the first image forming apparatus 40 of the present embodiment.

As shown in FIG. 2, the first image forming apparatus 40 is equipped with the image reading section 41, the operation displaying section 42, the printing section 43, a controller 44, an image controlling substrate 45, a hard disk drive (HDD) 46, a communicating section 47, and the like. The first image forming apparatus 40 is connected to an external apparatus 2 on a network 3 through a local area network interface (LANIF) 444 in the controller 44 in a state capable of mutually transmitting and receiving data.

The image reading section 41 is equipped with the automatic document feeder, the reading section, both mentioned above, and an image-reading controlling section 410. The image-reading controlling section 410 controls the automatic document feeder, the reading section, and the like on the basis of instructions from the controlling section 450 to realize a scanner function of reading a plurality of document images. The image data of an analog signal read by the image reading section 41 is output to a reading processing section 453, and is subjected to A/D conversion by the reading processing section 453 to receive various kinds of image processing.

The operation displaying section 42 is equipped with the LCD 421, the touch panel, and the like, all mentioned above, and an operation-displaying controlling section 420. The operation-displaying controlling section 420 makes the LCD 421 display various screens for a user to input various setting conditions, various processing results, and the like in conformity with display signals input from the controlling section 450. Moreover, the operation-displaying controlling section 420 outputs operation signals input from various switches, buttons, numeric keys, an operation key group, a touch panel, and the like to the controlling section 450.

The printing section 43 is equipped with the aforesaid sections pertaining to print outputting, such as the sheet feeding section 431, the sheet conveying section 432, the image forming section 433 of each color, the fixing section 434, and the like, and the printing section 43 is further equipped with a printing controlling section 430. The printing controlling section 430 controls the operation of each section of the printing section 43, such as the image forming section 433 of each color, in conformity with the instructions from the controlling section 450 to make each section perform image formation on the basis of printing image data input from a writing processing section 458.

The controller 44 performs the management and the control of data input from the external apparatus 2 and the like connected to the network 3 into the image forming system 1. The controller 44 receives the data of a printing object (printing data and printing setting data) from the external apparatus 2 and develops the printing data to generate image data. The controller 44 transmits the generated image data and the printing setting data to the image controlling substrate 45.

The controller 44 is composed of a controller controlling section 441, a dynamic random access memory (DRAM) controlling integrated circuit (IC) 442, an image memory 443, the LANIF 444, and the like.

The controller controlling section 441 controls the collective operation of each section of the controller 44. The controller controlling section 441 develops the printing data input from the external apparatus 2 through the LANIF 444 to generate image data of the bitmap format.

The DRAM controlling IC 442 controls the transfer of the printing data received through the LANIF 444 to the controller controlling section 441 and the writing/reading of image data and printing setting data to and from the image memory 443. Moreover, the DRAM controlling IC 442 is connected to a DRAM controlling IC 455 in the image controlling substrate 45 through a peripheral components interconnect (PCI) bus. The DRAM controlling IC 442 reads out the image data of a printing object and the printing setting data thereof from the image memory 443 and outputs the read data to the DRAM controlling IC 455 in conformity with an instruction from the controller controlling section 441.

The image memory 443 is a volatile memory, such as a DRAM. The image memory 443 temporarily stores the printing data and the printing setting data that are received through the LANIF 444 and generated image data.

The LANIF 444 is a communication interface, such as a network interface card (NIC) and a modem, for connecting the first image forming apparatus 40 to the network 3, such as a local area network (LAN). The LANIF 444 receives printing data and printing setting data from the external apparatus 2 and outputs the received printing data and the printing setting data to the DRAM controlling IC 442.

The image controlling substrate 45 is equipped with the controlling section 450, a nonvolatile memory 451, a random access memory (RAM) 452, the reading processing section 453, a compressing IC 454, the DRAM controlling IC 455, an image memory 456, an expanding IC 457, a writing processing section 458, and the like.

The controlling section 450 is composed of a central processing unit (CPU) and the like. The controlling section 450 reads out the system program and a designated program among the various application programs stored in the nonvolatile memory 451 to develop the read programs into the RAM 452. The controlling section 450 executes various kinds of processing in cooperation with the programs developed in the RAM 452 and performs the integrated control of each section in the first image forming apparatus 40.

Moreover, the controlling section 450 executes image data transferring processing in cooperation with image data transferring processing program read out from the nonvolatile memory 451 and various kinds of data. Moreover, the controlling section 450 executes image data writing processing in cooperation with image data writing processing program read out from the nonvolatile memory 451 and various kinds of data.

In the image data transferring processing, the controlling section 450 generates job data and compressed image data on the basis of the image data and the printing setting data that are input into the image controlling substrate 45 through the controller 44, or the image data input from the image reading section 41 and the setting data set by the operation displaying section 42. The controlling section 450 transmits the job data and the compressed image data to the second image forming apparatus 20.

The image data transferring processing includes first image data transferring processing and second image data transferring processing. The first image data transferring processing is a processing in a case that the controlling section 450 performs image formation by using the job data and the compressed image data as they are that are generated on the basis of the data input from the controller 44 or the image reading section 41. The second image data transferring processing is a processing in a case that there is some possibility that the controlling section 450 performs a setting change of the job data and the compressed image data.

In the first image data transferring processing, the controlling section 450 only transmits the compressed image data to be used for the image formation by the second image forming apparatus 20 to the second image forming apparatus 20 among a plurality of pieces of compressed image data to be used for a job. In particular, if the controlling section 450 executes a job in the both sides printing mode, the controlling section 450 transmits the compressed image data of the front side of a sheet to the second image forming apparatus 20 which performs the image formation on the front side of the sheet, when the controlling section 450 completes a writing preparation by generating the compressed image data of both sides of the sheet and storing the compressed image data into the compression memory 456a.

In the second image data transferring processing, the controlling section 450 transmits all the compressed image data to be used for a job to the second image forming apparatus 20.

In the image data writing processing, the controlling section 450 expands the compressed image data of the back side of a sheet to write an image thereon on the basis of job data and compressed image data in the both sides printing mode. The controlling section 450 does not write any images on a sheet conveyed from the reversing apparatus 30 and conveys the sheet through the sheet conveying path in the one side printing mode.

A job is a series of operations pertaining to image formation. For example, when a reproduction of a document of prescribed pages is produced, a series of operations pertaining to the image formation of the document of the prescribed pages is one job. The data for executing the operations of the job is job data.

Job data includes job information and page information.

The job information is the information common to all pages. For example, the job information includes a set number of copies of a job, an output mode (one side/both sides), an output tray, an applied function, a color mode, a paper type, and the like. The page information is associated with the compressed image data of each page, and the page information is the information pertaining to the associated compressed image data. For example, the page information includes a page number, an image size (length and width), an image direction, a rotation angle of an image, an image forming side (front/back), a storing address, and the like.

The nonvolatile memory 451 stores image data transferring processing programs (first image data transferring processing program and second image data transferring processing program), image data writing processing program, both pertaining to the present embodiment, the data processed by various programs, and the like in addition to various kinds of processing programs and various kinds of data pertaining to image formation.

The RAM 452 forms a work area for temporarily storing various programs to be executed by the controlling section 450, and various kinds of data pertaining to these programs, and the like. Moreover, the RAM 452 temporarily stores job data. The job data is generated by the controlling section 450 on the basis of the image data and the printing setting data, both input from the controller 44, or the image data input from the image reading section 41 and the setting data set by the operation displaying section 42 when the image data is obtained.

The reading processing section 453 performs various kinds of processing, such as analog processing, analog-to-digital (A/D) conversion processing, and shading processing, to the image data of an analog signal input from the image reading section 41, and after that, the reading processing section 453 generates image data of a digital signal. The reading processing section 453 outputs the generated image data to the compressing IC 454.

The compressing IC 454 performs compressing processing to input image data of a digital signal to output the processed image data to the DRAM controlling IC 455.

The DRAM controlling IC 455 controls the compressing processing of image data by the compressing IC 454 and the expanding processing of compressed image data by the expanding IC 457 and performs the input and output control of image data to and from the image memory 456 in conformity with instructions from the controlling section 450.

For example, when a saving instruction of image data read by the image reading section 41 is input from the controlling section 450 into the DRAM controlling IC 455, the DRAM controlling IC 455 makes the compressing IC 454 execute the compressing processing of the image data input into the reading processing section 453 and makes a compression memory 456a of the image memory 456 store and memorize the compressed image data. Moreover, when image data is input from the DRAM controlling IC 442 of the controller 44 into the DRAM controlling IC 455, the DRAM controlling IC 455 makes the compressing IC 454 execute the compressing processing of the image data and makes the compression memory 456a of the image memory 456 store and memorize the compressed image data.

Furthermore, when a print outputting instruction of the compressed image data stored in the compression memory 456a is input from the controlling section 450 into the DRAM controlling IC 455, the DRAM controlling IC 455 reads out the compressed image data from the compression memory 456a and makes the expanding IC 457 perform expanding processing to the compressed image data. Then, the DRAM controlling IC 455 makes a page memory 456b store the expanded image data therein. Furthermore, when a print outputting instruction of image data stored in the page memory 456b is input from the controlling section 450 into the DRAM controlling IC 455, the DRAM controlling IC 455 reads out the image data from the page memory 456b and outputs the read image data to the writing processing section 458.

The image memory 456 is equipped with the compression memory 456a and the page memory 456b. Each of the compression memory 456a and the page memory 456b is composed of a dynamic RAM (DRAM). The compression memory 456a is a memory for storing compressed image data. The page memory 456b is a memory for temporarily storing image data for print outputting or for temporarily storing data received from the controller 44 before the compression thereof.

The expanding IC 457 performs expanding processing to compressed image data.

The writing processing section 458 generates printing image data for image formation on the basis of the image data input from the DRAM controlling IC 455 and outputs the generated printing image data to the printing section 43.

The HDD 46 stores job data and compressed image data. The job of the job data and the compressed image data stored in the HDD 46 is called a saved job.

In the present embodiment, the HDD 46 is used as a storing medium for storing the job data and the compressed image data of a saved job. However, the storing medium is not limited to the HDD 46, but may be any rewritable nonvolatile memory.

The communicating section 47 is a communication interface (for example, a network interface card (NIC)) for connecting the first image forming apparatus 40 to the network to which each apparatus of the image forming system 1 including the second image forming apparatus 20 is connected, and the communicating section 47 transmits and receives various kinds of data.

Figure 3:
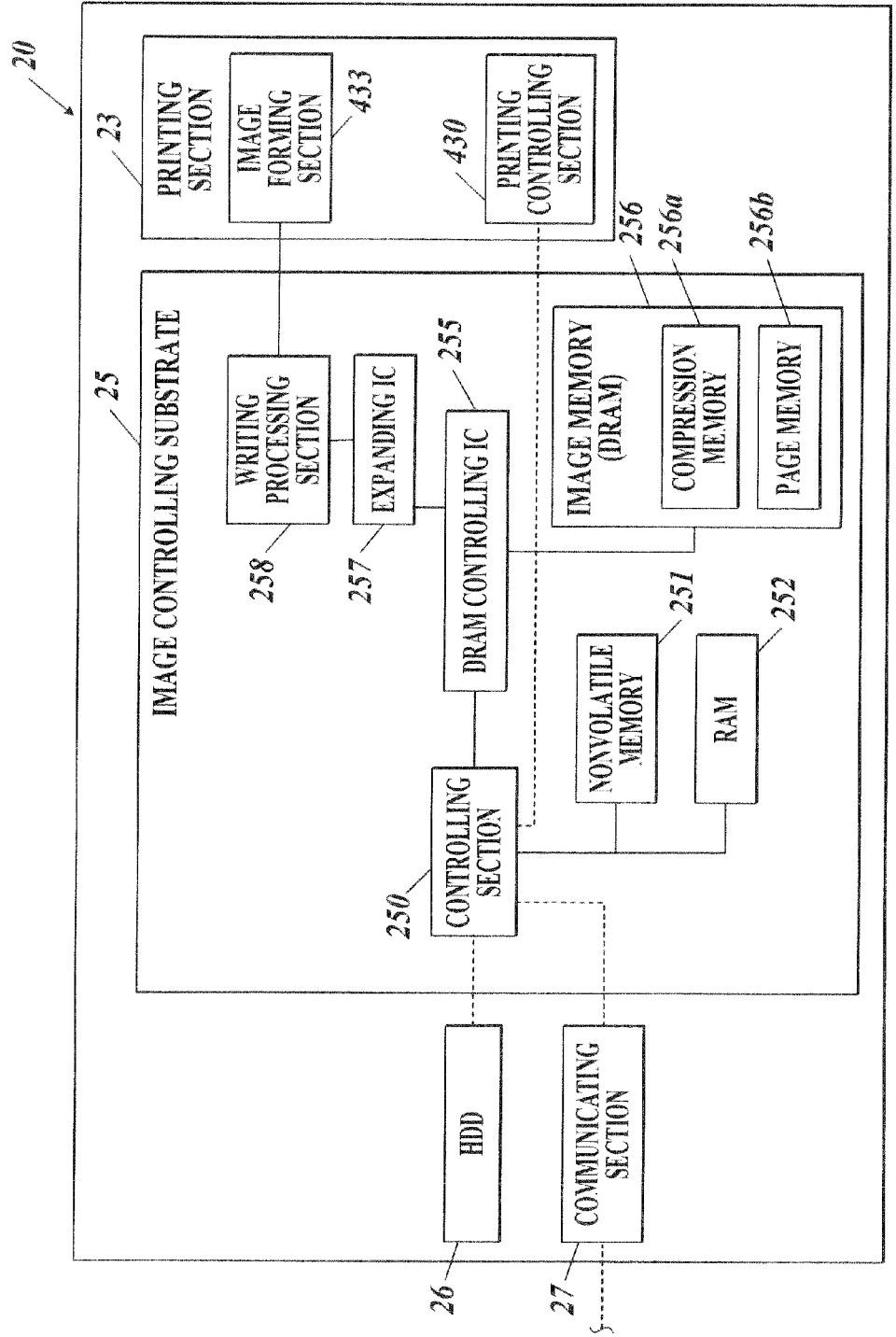
FIG. 3 is a schematic diagram of a second image forming apparatus.

FIG. 3 shows a schematic diagram of the second image forming apparatus 20 in the present embodiment.

As shown in FIG. 3, the second image forming apparatus 20 is equipped with the printing section 23, an image controlling substrate 25, a HDD 26, a communicating section 27, and the like.

Because the printing section 23 is similar to the printing section 43 of the first image forming apparatus 40, the same parts as those of the printing section 43 are denoted by the same marks as those of the printing section 43, and the descriptions of the same parts are omitted.

The image controlling substrate 25 is equipped with a controlling section 250, a nonvolatile memory 251, a RAM 252, a DRAM controlling IC 255, an image memory 256, an expanding IC 257, a writing processing section 258, and the like.

The controlling section 250 is composed of a CPU and the like. The controlling section 250 reads out the system program and a designated program among the various application programs stored in the nonvolatile memory 251 and develops the read programs into the RAM 252. The controlling section 250 executes various kinds of processing in corporation with the programs developed in the RAM 252 and performs the integrated control of each section of the second image forming apparatus 20.

Moreover, the controlling section 250 reads out image data receiving processing program according to the present embodiment from the nonvolatile memory 251 and executes image data receiving processing and image data writing processing in cooperation with various kinds of data.

The image data receiving processing includes first image data receiving processing to the first image data transferring processing and second image data receiving processing to the second image data transferring processing, which first and second image data transferring processing are executed by the first image forming apparatus 40. Moreover, the image data writing processing includes first data writing processing to be executed at the time when the first image data receiving processing is executed and second data writing processing to be executed at the time when the second image data receiving processing is executed.

In the first image data receiving processing, compressed image data transmitted from the first image forming apparatus 40 is received. A sheet feeding instruction is output to the sheet feeding apparatus 10 every reception of the compressed image data, and a sheet is fed from the sheet feeding apparatus 10. When a sheet fed from the sheet feeding apparatus 10 by the first image data receiving processing arrives at the resist sensor of the second image forming apparatus 20, the first image data writing processing is executed. In the first image data writing processing, the received compressed image data is expanded on the basis of the job data and the compressed image data, and the image of the expanded image data is written onto the sheet.

In the second image data receiving processing, in the one side printing mode, a sheet feeding instruction is output to the sheet feeding apparatus 10 every reception of compressed image data transmitted from the first image forming apparatus 40, and a sheet is fed from the sheet feeding apparatus 10. In the both sides printing mode, when a writing preparation is completed by receiving compressed image data of both the sides of a sheet from the first image forming apparatus 40 and storing the compressed image data in the compression memory 256a, a sheet feeding instruction is output to the sheet feeding apparatus 10, and a sheet is fed from the sheet feeding apparatus 10. When a sheet conveyed from the sheet feeding apparatus 10 by the second image data receiving processing arrives at the resist sensor, the second image data writing processing is executed. In the second image data writing processing, the compressed image data of the front side of the sheet is expanded based on the job data and the compressed image data thereof, and the image of the expanded image data is written onto the front side of the sheet.

The nonvolatile memory 251 stores image data receiving processing programs (first image data receiving processing program, second image data receiving processing program), image data writing processing programs (first image data writing processing program, second image data writing processing program), the data processed by various programs, all pertaining to the present embodiment, in addition to various kinds of processing programs and various kinds of data pertaining to image formation.

The RAM 252 forms a work area for temporarily storing various programs to be executed by the controlling section 250, various kinds of data pertaining to these programs, and the like. Moreover, the RAM 252 temporarily stores job data input from the first image forming apparatus 40 through the communicating section 27.

The DRAM controlling IC 255 controls the expanding processing of compressed image data by the expanding IC 257 in conformity with an instruction from the controlling section 250 and performs the input and output control of image data to the image memory 256.

For example, when job data and compressed image data are input from the communicating section 27 into the DRAM controlling IC 255, the DRAM controlling IC 255 makes the RAM 252 store the job data and makes the compression memory 256a in the image memory 256 store the compressed image data.

Moreover, when a print outputting instruction of compressed image data stored in the compression memory 256a is input from the controlling section 250 into the DRAM controlling IC 255, the DRAM controlling IC 255 reads out the compressed image data from the compression memory 256a and makes the expanding IC 257 perform the expanding processing of the read compressed image data. Then, the DRAM controlling IC 255 makes a page memory 256b store the expanded image data. Furthermore, when a print outputting instruction of the image data stored in the page memory 256b is input from the controlling section 250 into the DRAM controlling IC 255, the DRAM controlling IC 255 reads out the image data from the page memory 256b and outputs the read image data to the writing processing section 258.

The image memory 256 is equipped with the compression memory 256a and the page memory 256b. The compression memory 256a and the page memory 256b are each composed of a dynamic RAM (DRAM). The compression memory 256a is a memory for storing compressed image data. The page memory 256b is a memory for temporarily storing image data for print outputting.

The expanding IC 257 performs the expanding processing of compressed image data.

The writing processing section 258 generates printing image data for image formation on the basis of the image data input from the DRAM controlling IC 255 and outputs the generated printing image data to the printing section 23.

The HDD 26 stores the job data and the compressed image data of a saved job, both of which pieces of data are received through the communicating section 27.

In the present embodiment, the HDD 26 is used as the storing medium for storing the job data and the compressed image data of a saved job. However, the storing medium is not limited to the HDD 26, but any rewritable nonvolatile memory can be used as the storing medium.

The communicating section 27 is a communication interface for connecting the second image forming apparatus 20 to the network to which each apparatus of the image forming system 1 including the first image forming apparatus 40 is connected. The communicating section 27 performs the transmission and the reception of various kinds of data with each apparatus.

Next, the operation of the present embodiment will be described.

The processing in a case where the image formation is performed by using the job data and the compressed image data as they are that are generated on the basis of the data input from the controller 44 or the image reading section 41 of the present embodiment will be described with reference to FIGS. 4-7.

First, the processing at the time of transferring compressed image data from the first image forming apparatus 40 to the second image forming apparatus 20 will be described with reference to FIGS. 4 and 5.

Figure 4:
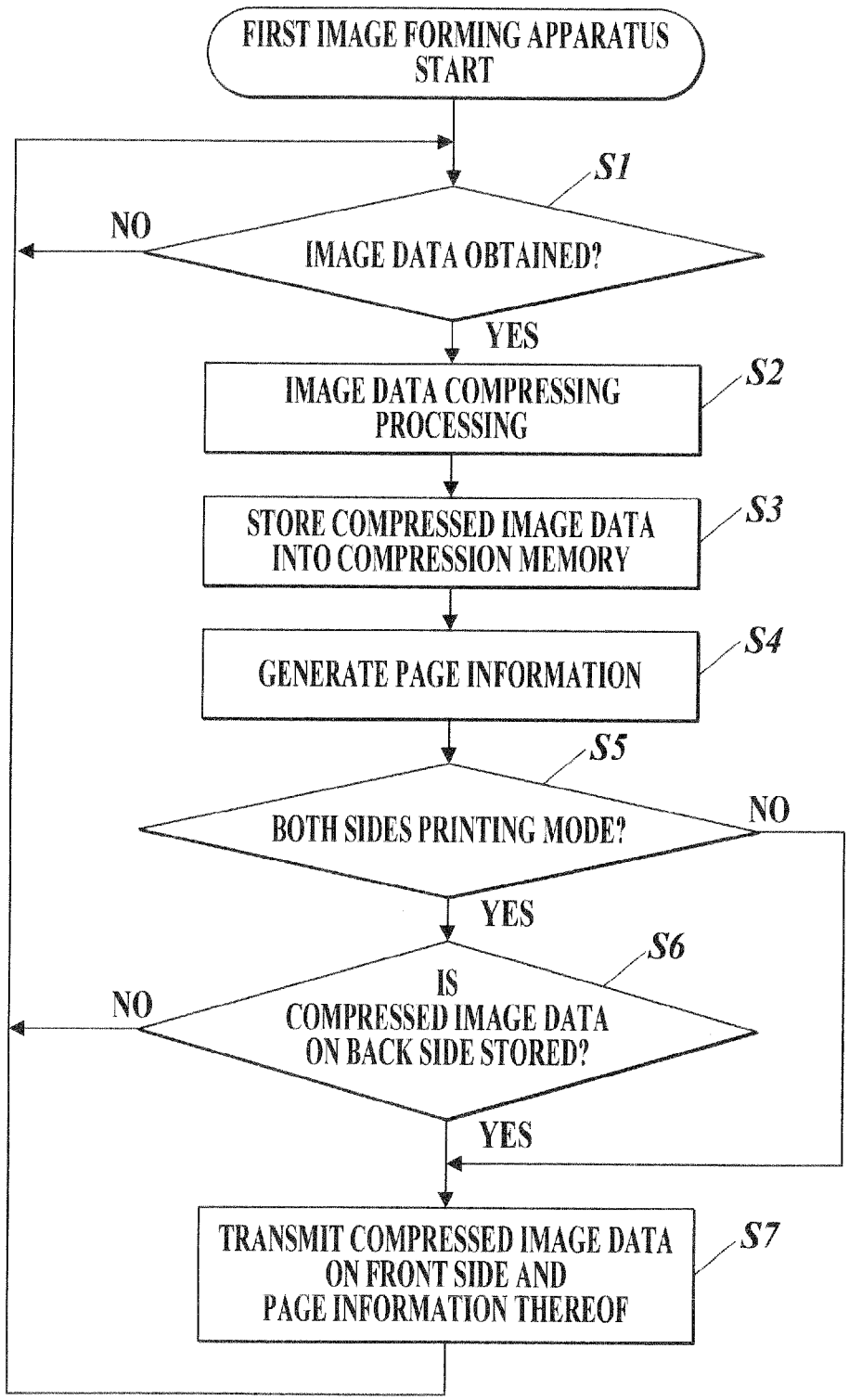
FIG. 4 is a flowchart of first image data transferring processing.

FIG. 4 shows a flow chart of first image data transferring processing to be executed by the first image forming apparatus 40. FIG. 5 shows a flowchart of first image data receiving processing to be executed by the second image forming apparatus 20.

The first image data transferring processing will be described with reference to FIG. 4. The first image data transferring processing shown in FIG. 4 is executed by the controlling section 450 with the cooperation of each section of the first image forming apparatus 40.

The controlling section 450 judges whether the controlling section 450 obtains the image data for one page or not which image data is input from the controller 44 or the operation displaying section 42 (Step S1). If the controlling section 450 does not obtain the image data (Step S1: NO), then the controlling section 450 returns the processing to that at Step S1.

If the controlling section 450 obtains the image data (Step S1: YES), the controlling section 450 makes the compressing IC 454 perform the compressing processing of the obtained image data (Step S2) and makes the compression memory 456a store the compressed image data (Step S3). Then the controlling section 450 generates the page information on the compressed image data stored in the compression memory 456a (Step S4).

If the obtained image data is that of the first page of a job, the controlling section 450 also generates job information at Step S4.

The controlling section 450 refers to the job information of the job including the image data obtained at Step S1 to judge whether the job is that of the both sides printing mode or not (Step S5). If the job is not that of the both sides printing mode, that is, if the job is that of the one side printing mode (Step S5: NO), the controlling section 450 advances the processing to that at Step S7.

If the job is that of the both sides printing mode (Step S5: YES), the controlling section 450 refers to the page information generated at Step S4 to judge whether the controlling section 450 stores the compressed image data of the back side of a sheet into the compression memory 456a or not at Step S3 (Step S6). If the controlling section 450 does not store the compressed image data of the back side into the compression memory 456a at Step S3 (Step S6: NO), the controlling section 450 returns the processing to that at Step S1.

If the job is that of the one side printing mode (Step S5: NO), or if the controlling section 450 makes the compression memory 456a store the compressed image data of the back side at Step S3 (Step S6: YES), the controlling section 450 transmits the compressed image data of the front side which image data forms a pair with the compressed image data of the back side and the page information of the compressed image data of the front side to the second image forming apparatus 20 through the communicating section 47 (Step S7). Then the controlling section 450 returns the processing to that at Step S1.

If the obtained image data is that of the first page of a job, the controlling section 450 also transmits the job information at Step S7.

The first image data receiving processing will be described with reference to FIG. 5. The first image data receiving processing shown in FIG. 5 is executed by the controlling section 250 with the cooperation of each section of the second image forming apparatus 20.

The controlling section 250 judges whether the controlling section 250 receives compressed image data of the front side and page information through the communicating section 27 or not (Step S11). If the controlling section 250 does not receive the compressed image data of the front side and the page information (Step S11: NO), the controlling section 250 returns the processing to that at Step S11.

If the controlling section 250 receives the compressed image data of the front side and the page information (Step S11: YES), the controlling section 250 makes the compression memory 256a store the received compressed image data therein and makes the RAM 252 temporarily store the page information therein (Step S12).

If the received compressed image data of the front side is that of the first page of a job, the controlling section 250 also receives the job information at Step S11 and makes the RAM 252 store the job information therein.

After the processing at Step S12, the controlling section 250 transmits a sheet feeding starting instruction of a sheet on which the image based on the compressed image data received at Step S11 will be formed to the sheet feeding apparatus 10 or to the sheet feeding section of the second image forming apparatus 20 (Step S13). Then the controlling section 250 returns the processing to that at Step S11.

If the sheet feeding apparatus 10 receives the sheet feeding starting instruction, the sheet feeding apparatus 10 selects a sheet feeding tray according to the sheet feeding starting instruction and feeds a sheet stored in the sheet feeding tray to the second image forming apparatus 20. If the sheet feeding section of the second image forming apparatus 20 receives the sheet feeding starting instruction, the sheet feeding section selects a sheet feeding tray thereof according to the sheet feeding starting instruction and feeds a sheet stored in the sheet feeding tray to the sheet conveying section of the second image forming apparatus 20.

If the received compressed image data is that of the first page of a job, the controlling section 250 sets the job including the compressed image data into the first image forming apparatus 40 and the second image forming apparatus 20 as the job to be executed in the image forming system 1 (execution job) in the processing at Step S13.

Next, the image data writing processing of each of the first image forming apparatus 40 and the second image forming apparatus 20 will be described with reference to FIGS. 7 and 6, respectively.

Figure 6:
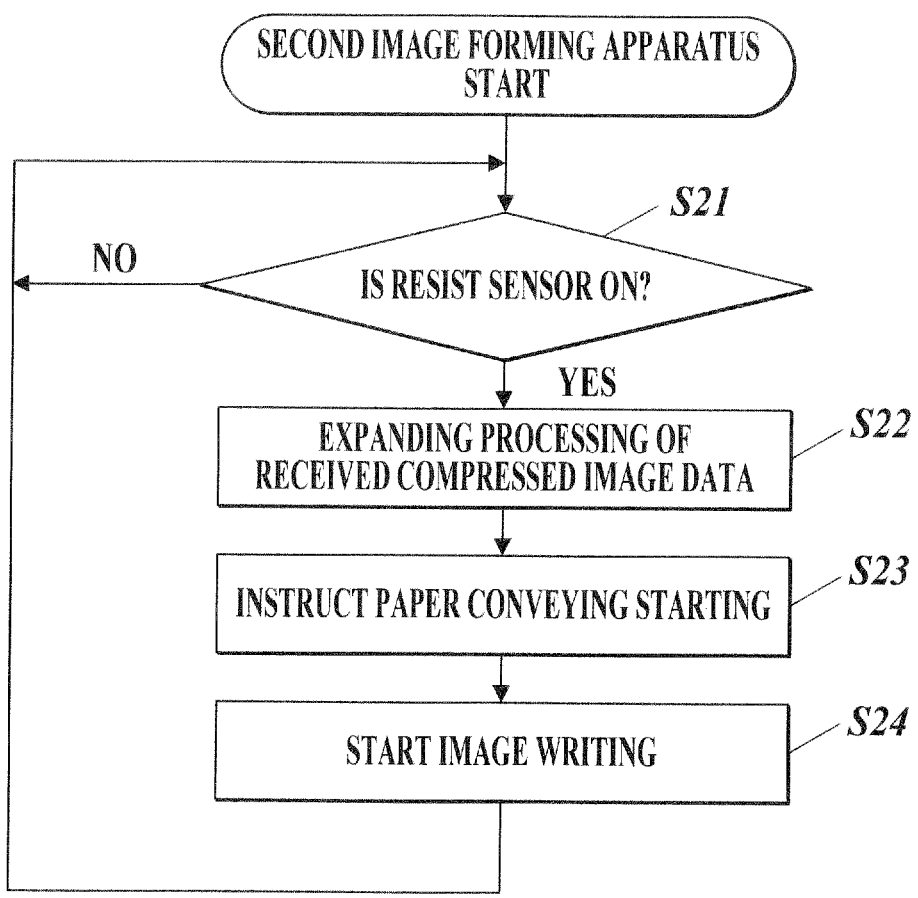
FIG. 6 is a flow chart of first image data writing processing.

FIG. 6 shows a flow chart of the first image data writing processing to be executed by the second image forming apparatus 20. FIG. 7 shows a flow chart of the image data writing processing to be executed by the first image forming apparatus 40.

The first image data writing processing will be described with reference to FIG. 6. The first image data writing processing shown in FIG. 6 is executed by the controlling section 250 with the cooperation of each section of the second image forming apparatus 20.

The controlling section 250 judges whether an ON signal is input from the resist sensor into the controlling section 250 or not (Step S21). The signal is input from the resist sensor when a sheet fed from the sheet feeding apparatus 10 or the sheet feeding section of the second image forming apparatus 20 passes by the resist sensor. If the ON signal is not input from the resist sensor into the controlling section 250 (Step S21: NO), the controlling section 250 returns the processing to that at Step S21.

If the ON signal is input from the resist sensor into the controlling section 250 (Step S21: YES), the controlling section 250 makes the expanding IC 257 expand the compressed image data of the front side received at Step S11 and makes the writing processing section 258 generate printing image data on the basis of the expanded image data (Step S22).

Moreover, the controlling section 250 outputs a convey starting instruction of a sheet halted by the resist roller to the printing section 23 (Step S23) and makes the printing section 23 start the writing of the image based on the printing image data (Step S24). Then, the controlling section 250 returns the processing to that at Step S21.

The image data writing processing will be described with reference to FIG. 7. The image data writing processing shown in FIG. 7 will be executed by the cooperation of the controlling section 450 of the first image forming apparatus 40 and each section thereof.

The controlling section 450 judges whether an ON signal is input from the resist sensor into the controlling section 450 or not (Step S31). The signal is input from the resist sensor when a sheet conveyed from the reversing apparatus 30 passes by the resist sensor. If the ON signal is not input from the resist sensor into the controlling section 450 (Step S31: NO), the controlling section 450 returns the processing to that at Step S31.

If the ON signal is input from the resist sensor into the controlling section 450 (Step S31: YES), the controlling section 450 outputs a convey starting instruction of the sheet halted by the resist roller to the printing section 43 (Step S32) and judges whether the execution job is that of the both sides printing mode or not (Step S33). If the execution job is not that of the both sides printing mode, that is, if the execution job is that of the one side printing mode (Step S33: NO), the controlling section 450 returns the processing to that at Step S31.

If the execution job is in the both sides printing mode (Step S33: YES), the controlling section 450 reads out the compressed image data of the back side of the sheet from the compression memory 456a and makes the expanding IC 457 expand the compressed image data of the back side (Step S34). Then, the controlling section 450 makes the writing processing section 458 generate printing image data on the basis of the expanded image data and makes the writing processing section 458 start the writing of an image of the printing image data (Step S35). Then, the controlling section 450 returns the processing to that at Step S31.

Next, the processing in a case where there is some possibility to perform setting changes of job data and compressed image data that are generated on the basis of the data input from the controller 44 or the image reading section 41 of the present embodiment will be described with reference to FIGS. 8-10.

First, the processing at the time of transferring compressed image data from the first image forming apparatus 40 to the second image forming apparatus 20 will be described with reference to FIGS. 8 and 9.

Figure 8:
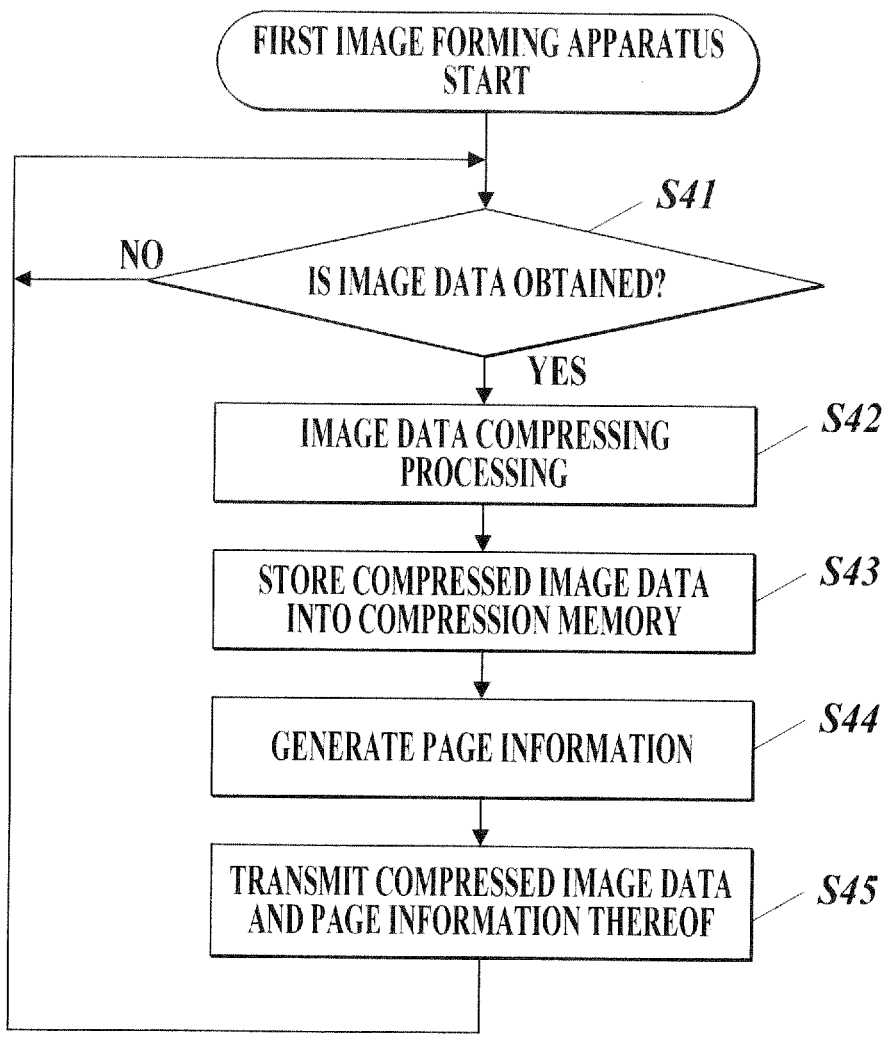
FIG. 8 is a flow chart of second image data transferring processing.

FIG. 8 shows a flow chart of the second image data transferring processing to be executed by the first image forming apparatus 40. FIG. 9 shows a flowchart of the second image data receiving processing to be executed by the second image forming apparatus 20.

The second image data transferring processing will be described with reference to FIG. 8. The second image data transferring processing shown in FIG. 8 is executed by the cooperation of the controlling section 450 of the first image forming apparatus 40 and each section thereof.

Because the processing at Steps S41-S44 is similar to that at Steps S1-S4 shown in FIG. 4, the description of the processing is omitted.

After the processing at Step S44, the controlling section 450 transmits the compressed image data stored in the compression memory 456a by the processing at Step S43 and the page information of the compressed image data to the second image forming apparatus 20 through the communicating section 47 (Step S45). Then the controlling section 450 returns the processing to that at Step S41.

If the obtained image data is that of the first page of a job, the controlling section 450 also transmits the job information thereof at Step S45.

The second image data transferring processing does not have the steps S5 and S6 described in FIG. 4, and the image data for all pages to be used for the job are transmitted to the second image forming apparatus 20.

The second image data receiving processing will be described with reference to FIG. 9. The second image data receiving processing shown in FIG. 9 is executed by the cooperation of the controlling section 250 of the second image forming apparatus 20 and each section thereof.

Figure 5:
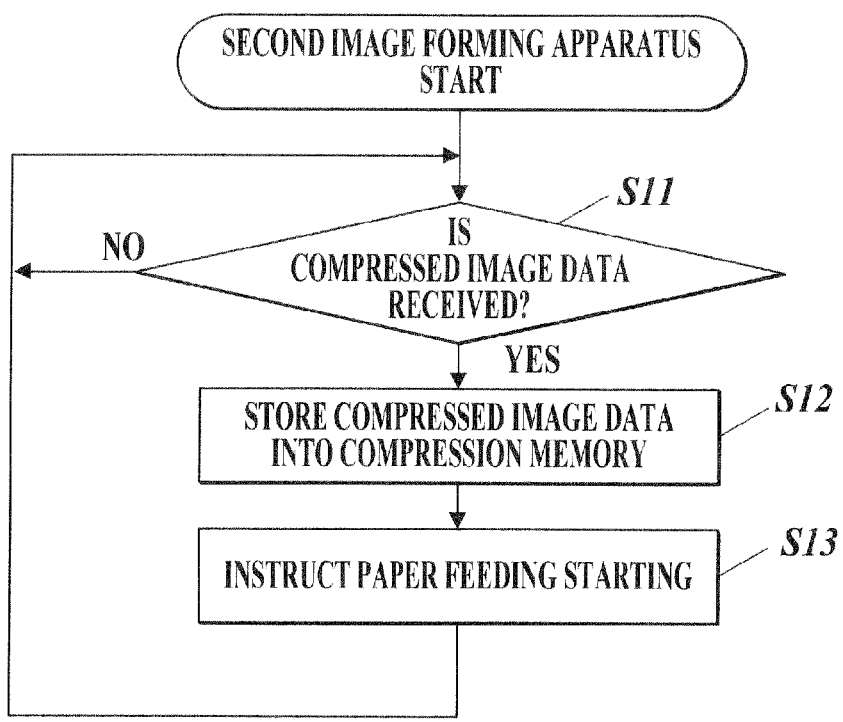
FIG. 5 is a flow chart of first image data receiving processing.

Because the processing at Steps S51 and S52 is similar to that at Steps S11 and S12 shown in FIG. 5, the description of the processing is omitted.

After the processing at Step S52, the controlling section 250 judges whether the job including the compressed image data received by the processing at Step S51 is in the both sides printing mode or not by referring to the job information thereof (Step S53). If the job is not in the both sides printing mode, that is, if the job is that of the one side printing mode (Step S53: NO), the controlling section 250 advances the processing to that at Step S55.

If the job is that of the both sides printing mode (Step S53: YES), the controlling section 250 refers to the page information received at Step S51 together with the compressed image data to judge whether the controlling section 250 stores the compressed image data of the back side of a sheet into the compression memory 256a at Step S52 or not (Step S54). If the controlling section 250 does not store the compressed image data of the back side into the compression memory 256a (Step S54: NO), the controlling section 250 returns the processing to that at Step S51.

If the job is that of the one side printing mode (Step S53: NO), or if the controlling section 250 stores the compressed image data of the back side into the compression memory 256a (Step S54: YES), the controlling section 250 transmits a sheet feeding starting instruction of a sheet on which the image based on the compressed image data received by the processing at Step S51 will be formed to the sheet feeding apparatus 10 or to the sheet feeding section of the second image forming apparatus 20 (Step S55), and the controlling section 250 returns the processing to that at Step S51.

If the sheet feeding apparatus 10 receives the sheet feeding starting instruction, the sheet feeding apparatus 10 selects a sheet feeding tray according to the sheet feeding starting instruction and feeds a sheet from the sheet feeding tray to the second image forming apparatus 20. If the sheet feeding section of the second image forming apparatus 20 receives the sheet feeding starting instruction, the sheet feeding section selects a sheet feeding tray according to the sheet feeding starting instruction and feeds a sheet from the sheet feeding tray to the sheet conveying section of the second image forming apparatus 20.

If the received compressed image data is that of the first page of a job, the controlling section 250 sets the job including the compressed image data into the first image forming apparatus 40 and the second image forming apparatus 20 as the job to be executed by the image forming system 1 (execution job) in the processing at Step S55.

Next, the second image data writing processing to be executed by the second image forming apparatus 20 will be described.

Figure 10:
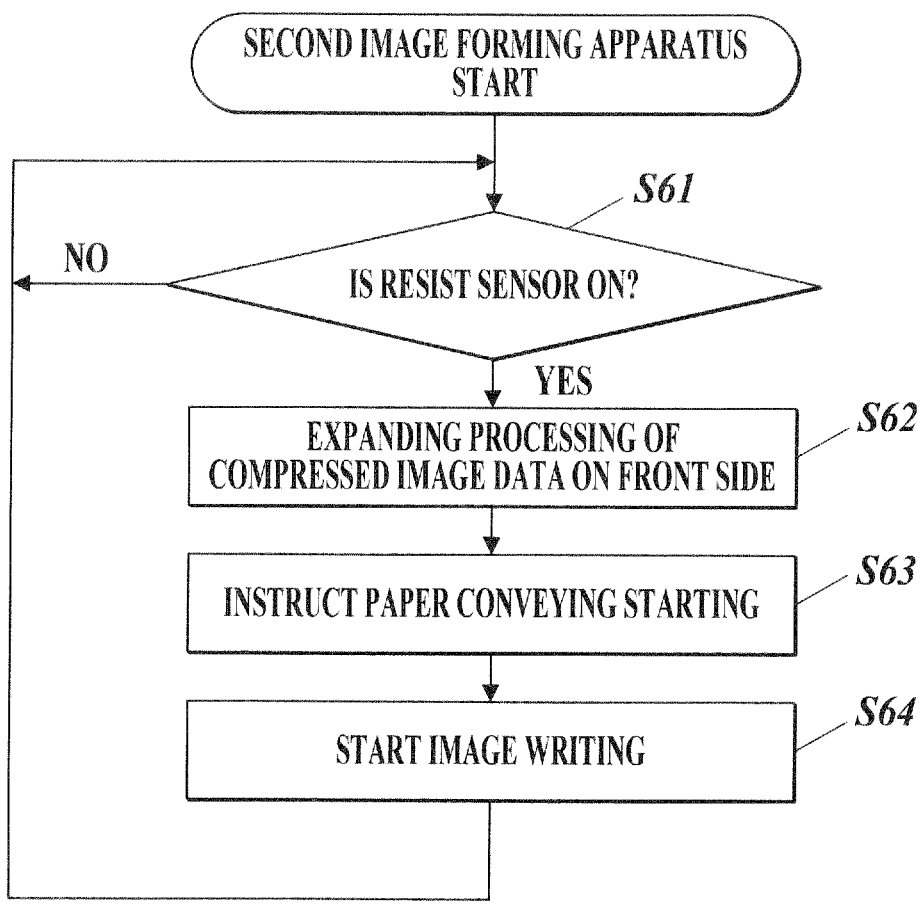
FIG. 10 is a flow chart of second image data writing processing.

FIG. 10 shows a flow chart of the second image data writing processing.

Figure 7:
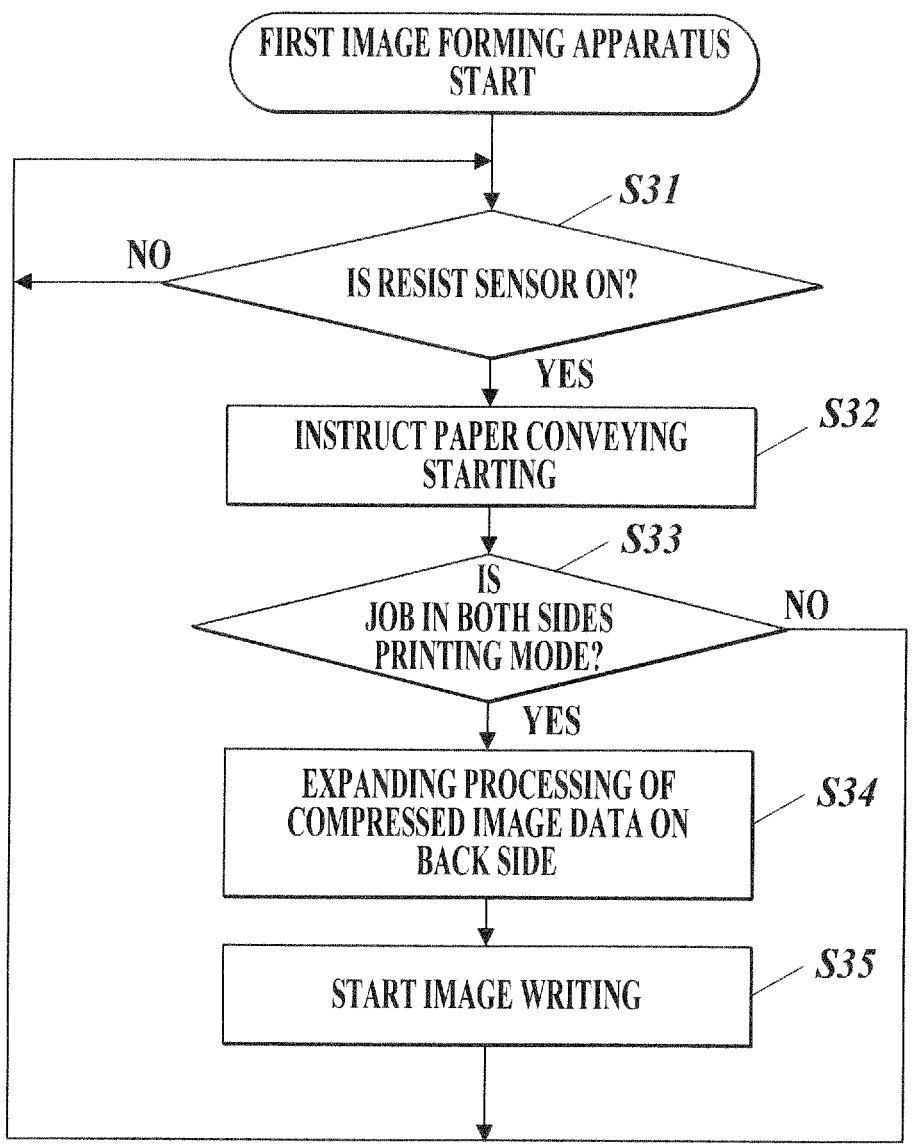
FIG. 7 is a flow chart of image data writing processing.

The first image forming apparatus 40 executes the aforesaid image data writing processing shown in FIG. 7 when executing the second image data transferring processing. The illustration and the description of the image data writing processing to be executed by the first image forming apparatus 40 are accordingly omitted.

The second image data writing processing will be described with reference to FIG. 10. The second image data writing processing shown in FIG. 10 will be executed by the cooperation of the controlling section 250 of the second image forming apparatus 20 and each section thereof.

The controlling section 250 judges whether an ON signal is input from the resist sensor into the controlling section 250 or not (Step S61). The signal is input from the resist sensor when a sheet fed from the sheet feeding apparatus 10 or the sheet feeding section of the second image forming apparatus 20 passes by the resist sensor. If the ON signal is not input from the resist sensor into the controlling apparatus 250 (Step S61: NO), the controlling section 250 returns the processing to that at Step S61.

If the ON signal is input from the resist sensor into the controlling section 250 (Step S61: YES), the controlling section 250 reads out the compressed image data of the front side of the sheet which compressed image data is stored in the compression memory 256a and makes the expanding IC 257 expand the compressed image data of the front side (Step S62). Then, the controlling section 250 makes the writing processing section 258 generate printing image data on the basis of the expanded image data.

If the page information of the compressed image data includes no designation of an image forming side at Step S62 (that is, at the one side printing mode), the controlling section 250 makes the expanding IC 257 expand the compressed image data received at Step S51.

Moreover, the controlling section 250 outputs a conveyance starting instruction of a sheet halted by the resist roller to the printing section 23 (Step S63). Then the controlling section 250 makes the printing section 23 start the writing of the image of the printing image data (Step S64). Then, the controlling section 250 returns the processing to that at Step S61.

As described above, according to the present embodiment, the second image forming apparatus 20 is provided on the upstream side of the first image forming apparatus 40 in the sheet conveying direction, and the first image forming apparatus 40 transmits the compressed image data generated on the basis of printing data received by the first image forming apparatus 40 and image data to the second image forming apparatus 20. Consequently, when a sheet on which an image is formed is conveyed from the second image forming apparatus 20 to the first image forming apparatus 40, the first image forming apparatus 40 completes the preparation of image data. Accordingly, no timing adjustment and no sheet halting mechanisms in sheet conveyance between the first image forming apparatus 40 and the second image forming apparatus 20 are thereby needed, and productivity can be improved.

Moreover, as shown in FIGS. 4 and 5, the first image forming apparatus 40 only transmits the compressed image data to be used for the image formation by the second image forming apparatus 20 among the plurality of pieces of compressed image data to be used for a job, and the reduction of the transferring load and the shortening of the transferring time of data between the first image forming apparatus 40 and the second image forming apparatus 20 can thereby be achieved.

Furthermore, as shown in FIGS. 4-7, if a job of the both sides printing mode is executed, the first image forming apparatus 40 transmits the compressed image data of the front side of a sheet to the second image forming apparatus 20 when the first image forming apparatus 40 completes the writing preparation of the image data on both the sides of the sheet. Consequently, when the second image forming apparatus 20 receives the compressed image data of the front side, the first image forming apparatus 40 already completes the writing preparation of the image data of the back side. Accordingly, no timing adjustment and no sheet halting mechanisms in sheet conveyance between the first image forming apparatus 40 and the second image forming apparatus 20 are thereby needed.

Figure 9:
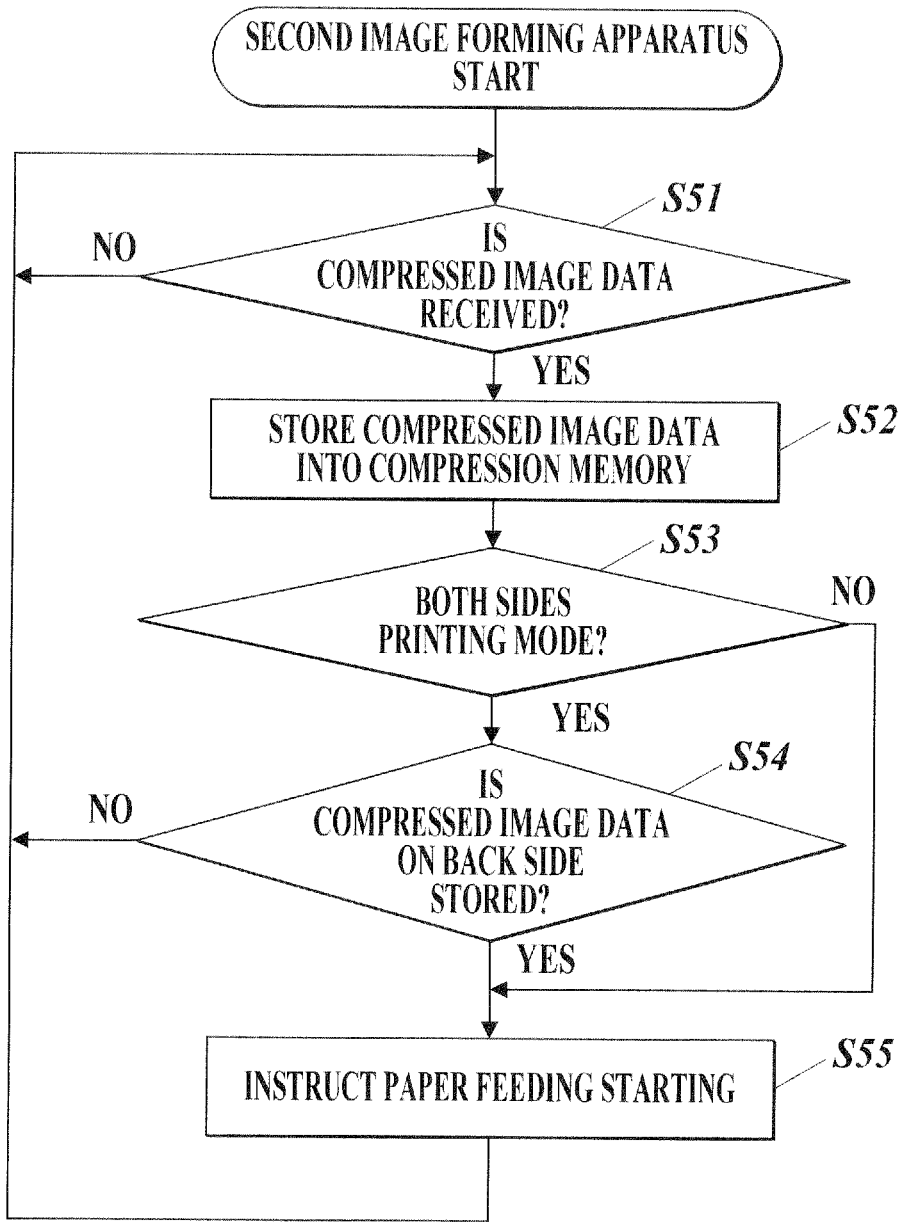
FIG. 9 is a flow chart of second image data receiving processing.

Moreover, as shown in FIGS. 8 and 9, the first image forming apparatus 40 transmits all of the image data to be used for a job, and thereby the re-transferring of compressed image data can be omitted when a setting change of a job arises after transferring the compressed image data.

As shown in FIGS. 7-10, in a job of the both sides printing mode, when the second image forming apparatus 20 receives the image data of both the sides of a sheet and the writing preparation of the image data is completed, a sheet is fed so that the image formation is performed on the front side of the sheet. Consequently, the writing preparation of the image data of the back side of the sheet is already completed in the first image forming apparatus 40 when the sheet is fed thereto. As is the case with FIGS. 4-6, no timing adjustment and no sheet halting mechanisms in sheet conveyance between the first image forming apparatus 40 and the second image forming apparatus 20 are thereby needed.

Although the example of using the nonvolatile memories 251 and 451 as the computer-readable media of the programs according to the present invention is disclosed in the above description, the present invention is not limited to this example.

A nonvolatile memory, such as a flash memory, and a portable recording medium, such as a compact disc read-only memory (CD-ROM), can be applied to the present invention as the computer-readable media.

Moreover, also a carrier wave can be applied to the present invention as a medium for supplying the data of the programs according to the present invention through a communication line.

Moreover, the present invention is not limited to the contents of the embodiment described above, but the contents can suitably be changed without departing from the sprit and the scope of the present invention.

For example, the case where there are two image forming apparatus are described in the above description. However, three or more image forming apparatuses may be used by being connected in series with one another. In this case, any two of the image forming apparatuses are set as the first image forming apparatus and the second image forming apparatus. The three or more image forming apparatus may have two or more second image forming apparatuses.

According to one aspect of the present invention, a tandem-type image forming system comprises a plurality of image forming apparatuses connected in series, the image forming apparatuses which respectively perform image formation on sides of a sheet, thereby performing a job, the image forming apparatuses including: a first image forming apparatus; and a second image forming apparatus provided upper than the first image forming apparatus in a sheet conveying direction, wherein the first image forming apparatus includes: a controlling section which controls transmission of image data generated based on printing data of the job received by the first image forming apparatus to the second image forming apparatus, and the second image forming apparatus includes: a controlling section which controls feeding of a sheet on which the image formation is performed based on the image data received from the first image forming apparatus.

Preferably, the first image forming apparatus is provided downmost in the sheet conveying direction among the image forming apparatuses.

Preferably, the controlling section of the first image forming apparatus transmits, among the image data of the job, image data based on which the second image forming apparatus performs the image formation to the second image forming apparatus, and the controlling section of the first image forming apparatus does not transmit, among the image data of the job, image data based on which the first image forming apparatus performs the image formation to the second image forming apparatus.

Preferably, the image forming apparatuses include a plurality of the second image forming apparatuses, when the image forming system executes the job of a both sides printing mode in which the image formation is performed on both sides of a sheet, the first image forming apparatus performs the image formation on a back side of a sheet, and a second image forming apparatus among the second image forming apparatuses performs the image formation on a front side of the sheet, and the controlling section of the first image forming apparatus transmits the image data for the front side of the sheet to the second image forming apparatus which performs the image formation on the front side of the sheet, when the controlling section of the first image forming apparatus completes writing preparation of the image data for the both sides of the sheet.

Preferably, the controlling section of the first image forming apparatus transmits all of the image data of the job to the second image forming apparatus.

Preferably, the image forming apparatuses include a plurality of the second image forming apparatuses, when the image forming system executes the job of a both sides printing mode in which the image formation is performed on both sides of a sheet, the first image forming apparatus performs the image formation on a back side of a sheet, and a second image forming apparatus among the second image forming apparatuses performs the image formation on a front side of the sheet, and the controlling section of the second image forming apparatus makes a sheet fed so that the image formation is performed on the front side of the sheet, when the controlling section of the second image forming apparatus receives all of the image data for the both sides of the sheet from the first image forming apparatus and completes writing preparation of the image data.

According to one aspect of the present invention, no timing adjustment in sheet conveyance between image forming apparatus and no sheet halting mechanisms are needed, and productivity can be improved.

The present US patent application claims the priority under the Paris Convention for the Protection of Industrial Property on the basis of Japanese Patent Application No. 2010-239161, filed in the Japan Patent Office on Oct. 26, 2010, and the Japanese Patent Application constitutes the basis for the corrections of erroneous translations in the US patent application.

What is claimed is:

1. A tandem-type image forming system comprising:
a plurality of image forming apparatuses connected in series, the image forming apparatuses respectively performing image formation on sides of a sheet, thereby performing a job, the image forming apparatuses including:
a first image forming apparatus provided at a downstream side in a sheet conveyance direction; and
a second image forming apparatus provided upstream of the first image forming apparatus in the sheet conveying direction;
wherein the first image forming apparatus includes a first controlling section which receives printing data of the job and which controls transmission of image data generated based on the printing data to the second image forming apparatus provided upstream of the first image forming apparatus; and
wherein the second image forming apparatus includes a second controlling section which controls a start of feeding of a sheet on which the image formation is performed based on the image data received from the first image forming apparatus provided at the downstream side.

2. The image forming system according to claim 1, wherein the first image forming apparatus is provided at a most downstream position in the sheet conveying direction among the plurality of image forming apparatuses.

3. The image forming system according to claim 1, wherein the first controlling section transmits to the second image forming apparatus, among the image data, image data based on which the second image forming apparatus performs the image formation, and wherein the first controlling section does not transmit to the second image forming apparatus, among the image data, image data based on which the first image forming apparatus performs the image formation.

4. The image forming system according to claim 1, wherein:
the plurality of image forming apparatuses include a plurality of the second image forming apparatuses;
when the image forming system executes the job in a both sides printing mode in which the image formation is performed on both sides of a sheet, the first image forming apparatus performs the image formation on a back side of a sheet, and a second image forming apparatus among the plurality of second image forming apparatuses performs the image formation on a front side of the sheet; and
the first controlling section transmits the image data for the front side of the sheet to the second image forming apparatus which performs the image formation on the front side of the sheet, when the first controlling section completes writing preparation of the image data for the both sides of the sheet.

5. The image forming system according to claim 1, wherein the first controlling section transmits all of the image data to the second image forming apparatus.

6. The image forming system according to claim 1, wherein:
the plurality of image forming apparatuses include a plurality of the second image forming apparatuses
when the image forming system executes the job in a both sides printing mode in which the image formation is performed on both sides of a sheet, the first image forming apparatus performs the image formation on a back side of a sheet, and a second image forming apparatus among the plurality of second image forming apparatuses performs the image formation on a front side of the sheet; and
the second controlling section controls the feeding of the sheet so that the image formation is performed on the front side of the sheet, when the second controlling section receives all of the image data for the both sides of the sheet from the first image forming apparatus and completes writing preparation of the image data.

* * * * *